United States Patent [19]

Goehlich et al.

[11] 4,357,487

[45] Nov. 2, 1982

[54] CABLE FITTING WITH SLOTTED METALLIC HOUSING

[75] Inventors: Lothar Goehlich; Jürgen Haug, both of Berlin, Fed. Rep. of Germany

[73] Assignee: Siemens Aktiengesellschaft, Berlin and Munich, Fed. Rep. of Germany

[21] Appl. No.: 187,059

[22] Filed: Sep. 15, 1980

[30] Foreign Application Priority Data

Sep. 28, 1979 [DE] Fed. Rep. of Germany ....... 2939933

[51] Int. Cl.³ .......................................... H02G 15/184
[52] U.S. Cl. .................................................. 174/73 R
[58] Field of Search .............. 174/21 C, 73 R, 73 SC, 174/78, 88 C; 339/61 R, 136 R, 136 C, 137, 141, 143 R, 143 C, 205, 258 A, 258 RR

[56] References Cited

U.S. PATENT DOCUMENTS 3,275,967 9/1966 Hamm ................................ 339/61 R
3,335,215 8/1967 Huber ................................. 174/73 R

FOREIGN PATENT DOCUMENTS 2419843 11/1974 Fed. Rep. of Germany ...... 174/102 SP
2726402 12/1978 Fed. Rep. of Germany .... 174/73 R
2726403 12/1978 Fed. Rep. of Germany .... 174/73 R
564029 6/1957 Italy .................................. 174/73 R Primary Examiner—Laramie E. Askin
Attorney, Agent, or Firm—Kenyon & Kenyon

[57] ABSTRACT

Fittings for plastic insulated medium voltage cables, which can be pushed on or plugged in, consisting essentially of an elastic insulating body with an outer contact protection in which a metallic housing which is axially slotted one or more times is used as contact protection. The slots, which are parallel or inclined to the housing axis and can be interrupted one or more times, ensure radial elasticity of the metallic housing. The housing can be embedded in the elastic insulating body, preferably in an electrically conducting layer of the insulating body.

17 Claims, 19 Drawing Figures

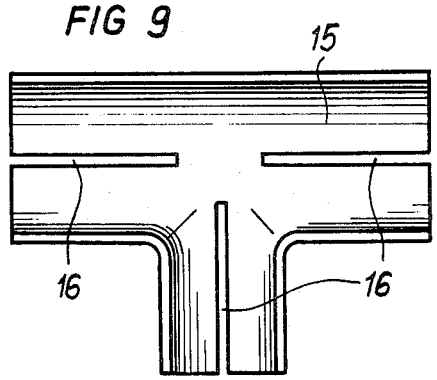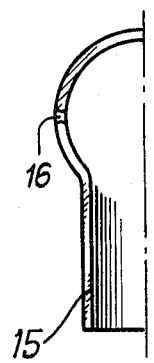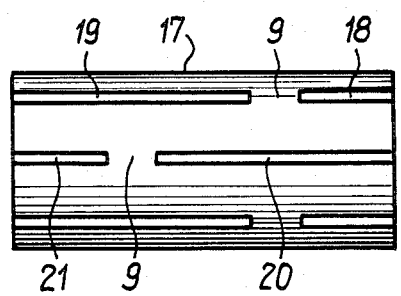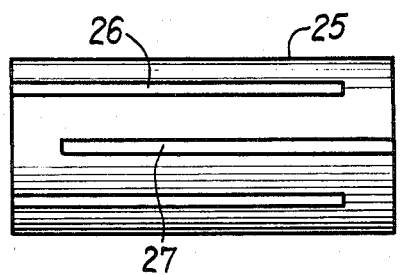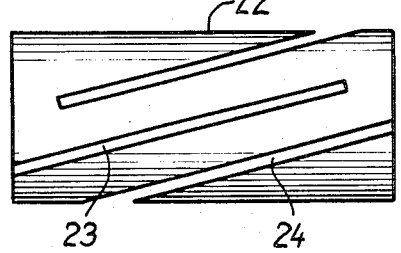

CABLE FITTING WITH SLOTTED METALLIC HOUSING

BACKGROUND OF THE INVENTION

1. Field of the Invention

This invention relates to fittings for plastic insulated electric cables in general and more particularly to the design of prefabricated fittings or fitting parts with an elastic insulating body and metallic housing.

2. State of the Art

For plastic insulated medium and high voltage cables, especially for such cables with insulation of thermoplastic or cross-linked polyethylene, fittings and fitting parts have recently been developed which are pushed onto the appropriately prepared cable end or are plugged into the appropriately processed cable ends. These fittings consist essentially of an elastic insulating body consisting of an ethylene-propylene terpolymer rubber or silicone rubber and are provided with elements for controlling the electric field. Their inside hole is smaller than the outside diameter of the respective prepared cable conductor with which they are used. Upon pushing onto the cable conductor, or plugging a cable end in, the fitting parts are expanded enough that a press fit without voids is obtained on the conductor insulation.

To design such fittings or fitting parts with contact protection and to allow a metallic through connection of the cable shields, metallic housings have been provided. If the housing is of tubular design, a compressible foam layer or an air cushion arranged between elastic ribs is disposed between the housing and the elastic insulating body, so as to avoid a narrowing of the radial elastic expandability of the insulating body (DE-OS No. 27 26 402, DE-OS No. 27 26 403). These measures, however, increase the thermal resistance of the fitting as a whole.

A cable fitting in the form of a connecting sleeve, made using casting resin is also known, in which a metal cylinder is arranged within the housing for connecting through the cable shields. This cylinder is formed of a piece of expanded metal (DE-AS No. 16 65 218). The cutouts in the cylinder ensure that the cylinder is embedded in the cast resin body.

A shielded electric cable is furthermore known, in which the shield consists of a metal strip which is subdivided into a number of narrow ribbons which are connected by transverse bridges by elongated narrow holes extending in the lengthwise direction. Because of the perforation it is possible to contact or twist the shielding band to form an electric conductor similar to individual wires (DE-OS No. 24 19843).

Starting from a fitting for plastic insulated cables, especially medium or high voltage cables, which consists of an elastic, prefabricated insulating body which is provided with a hole and may contain an electrical connecting element, with a tubular metallic housing, it is an object of the present invention to reduce the thermal resistance between the insulating body and the metallic housing without, at the same time, narrowing down the radial elastic expandability of the insulating body.

SUMMARY OF THE INVENTION

To solve this problem, according to the present invention the tublar housing is slotted one or more times and the slots extend parallel or helically to the housing axis.

The slotted design of the metallic housing provided according to the present invention makes it possible for the metallic housing to be elastically deformed radially. It can therefore also follow the elastic diameter changes of the insulating body during installation and operation. Accordingly, the metallic housing can be in direct contact with the insulating body, which provides an optimum heat transfer resistance. Intermediate foam layers or air cushions can be omitted; the overall diameter of the fitting is also reduced thereby.

The radial elasticity of the metallic housing can be achieved by different designs of the slots or also can be influenced as to its magnitude. For instance, the housing can be provided with a slot extending from one end to the other. However, this could lead to difficulties in the fabrication of the fitting body because of the instability of the tubular housing if the metallic housing is embedded in the insulating body. It is therefore advisable if the slot or slots provided in the housing are interrupted one or more times. In connecting sleeves, for instance, the interruptions will advantageously be provided about in the middle of the housing because there the least amount of elastic expansion is necessary. In any case, it is advisable to arrange the slots uniformly distributed over the circumference of the tubular housing. To ensure uniform elastic expandability of the housing over its length, one can proceed in such a manner that the slot ends of slots adjacent in the circumferential direction of the tubular housing are arranged offset relative to each other in the axial direction.

In the mentioned embodiments of the housing it is assumed that the housing consists of a metallic tube or a sheet metal strip formed into a tube, or that it consists of deep-drawn, half shell-like parts which can be connected to each other by integral straps. However, the housing can also be constructed from several sheet metal strips which are arranged at a spacing from each other. The sheet metal strips can be secured relative to each other by means of one or several rings, or even by the insulating body of the fitting itself.

In the interest of making the electric field in the region of the cable fitting as homogenous as possible, it is advisable to bridge the slot or slots in the metallic housing electrically at least on the inside of the housing by means of an electrically conductive elastic plastic. This is done advantageously by means of a tubular, electrically conducting layer. If the latter is made sufficiently thick and elastic, it can also form the outer layer of the insulating body and accept the metallic housing in the form of an embedment. However, the tubular metallic housing can also be embedded in the insulating body itself, especially in conjunction with an underlying electrically conducting layer.

In view of the corrosive environmental conditions, it is advisable to provide the surface of the tubular metallic housing with corrosion protection. This may be a special corrosion protection compound or also a simple plastic layer which may be made electrically conducting. Furthermore, cementing the tubular housing to the insulating body by means of an adhesion agent can be considered. The adhesion agent may then have corrosion protection properties.

The embodiment of the cable fitting provided according to the present invention is not limited to fittings with a straight through axis. Similarly, T-shaped designs are of interest. Such shapes are required, for instance, in branch sleeves. In addition, elbow designs such as are common, for instance, for plug-in connections of cables to electric equipment such as transformers are of interest.

BRIEF DESCRIPTION OF THE DRAWINGS

FIG. 9 is an elevation view of a half shell used along with another identical half shell to make a "T" fitting according to the present invention.

FIG. 10 is an end view of the half shell of FIG. 9.

FIG. 11 is an elevation view of a further embodiment of metallic housing having interrupted slots which can be used in the fitting of the present invention.

FIG. 12 is still another embodiment of metallic housing having slots starting alternatingly from opposite ends of the metallic housing.

FIG. 13 is a further embodiment of the present invention having inclined slots.

DETAILED DESCRIPTION OF THE INVENTION

Figure 1:
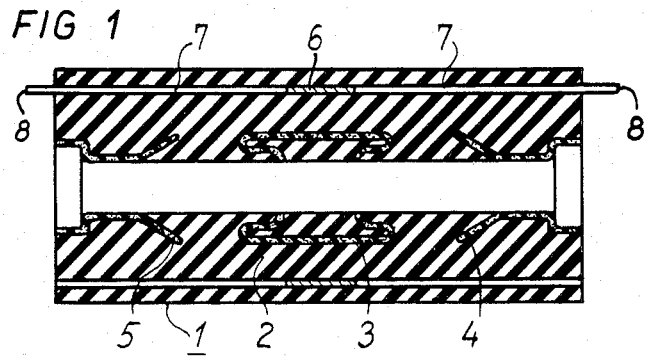
FIG. 1 is a cross-sectional view of a first embodiment of the present invention.
Figure 2:
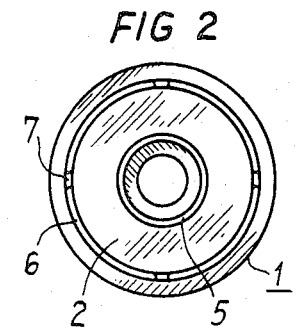
FIG. 2 is an end view of the embodiment of FIG. 1.

FIGS. 1 and 2 show a connecting fitting 1 which consists in substance of an elastic insulating body 2 of silicone rubber and a metallic housing 6. The insulating body 2 has a through hole for inserting appropriately prepared cable ends. A shielding cylinder 3 is embedded in the center and two deflectors 4 and 5 of electrically conductive elastic material embedded at the ends.

The metallic housing is of tubular shape and is provided with the slots 7 which extend from the ends toward the middle. On the right as well as on the left side of the metallic housing, four slots each are provided which are arranged uniformly distributed at the circumference of the housing. Of the sheet metal strips formed by the slots 7, one is always extended outward at both ends of the fitting 1 so that the electrical connection of the shield of the cables to be connected can be made at these extensions 8. Fabrication can be carried out as described in DE-OS No. 27 26 402.

The metallic housing 6 is completely embedded in the elastic insulating body 2. The housing 6, prior to embedment into the insulating body 2, is coated with an electrically conducting layer of silicone rubber, which is joined, during the manufacture of the insulating body 2, to this insulating body in a tightly adhering manner.

Figure 3:
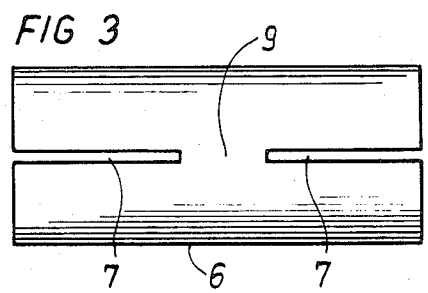
FIG. 3 is an elevation view of a metallic housing which can be used in conjunction with the fittings of the present invention.
Figure 4:
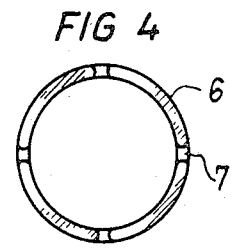
FIG. 4 is an end view of the metallic housing of FIG. 3.

The metallic housing 6 is shown again in FIGS. 3 and 4 in a longitudinal view and an end view. It will be seen that the slots 7 are not made continuous but have an interruption 9 approximately in the middle of the housing. This interruption is in the region of low elastic expansion of the overall fitting part, since no press fit of the insulating body 2 on the conductor to be connected is necessary in the vicinity of the junction, arranged approximately in the middle of the conductors.

Figure 5:
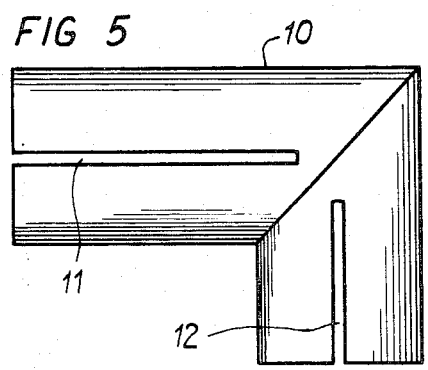
FIG. 5 is an elevation of an elbow metallic housing which can be used in conjunction with a fitting according to the present invention.
Figure 6:
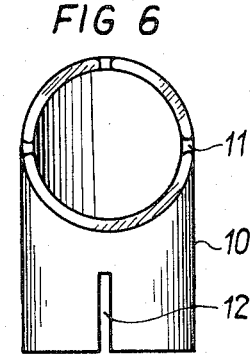
FIG. 6 is an end view of the metallic housing of FIG. 5.

FIGS. 5 and 6 show an angled metallic housing 10, such as as can be used, for instance, in plug connections at transformers. In this elbow design of the housing, the slots 11 are parallel to the one tube axis and the slots 12 are parallel to the other tube axis. In the vicinity of the knee, the slots are interrupted; in view of the whole fitting, the electrically conducting connection of the electric cable to be connected with the electrical equipment is made at this point.

Figure 7:
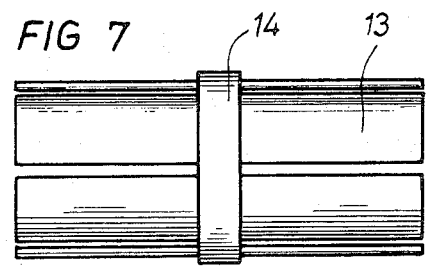
FIG. 7 is an elevation view of a further embodiment of metallic housing which can be used in conjunction with the fittings of the present invention.
Figure 8:
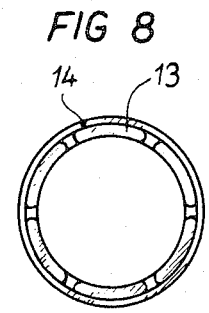
FIG. 8 is an end view of the metallic housing of FIG. 7.

FIGS. 7 and 8 show a metallic housing which consists of several sheet metal strips 13 which are closely spaced on a cylindrical circumferential surface. These strips are fixed relative to each other and electrically connected to each other by means of a metallic ring 14.

The housing shown in FIGS. 9 and 10 consists of two similar half-shells which are connected together by means of straps, not shown in detail. The housing is T shaped and consists of deep drawn sheet metal, slots 16 being provided parallel to the axes of the housing.

FIG. 11 shows a variant for a metallic housing 17, in which the interruptions 9 of the slots 18 and 19 or 20 and 21 are arranged offset with respect to each other. In this manner, an elastic behavior of the housing 17 is achieved in the radial direction even in the region of the interruptions 9.

In the embodiment of a metallic housing 25 shown in FIG. 12, the slots 26 and 27 start alternatingly from the one and the other end of the housing. The slot interruptions are then likewise provided at the end of the housing and thus are arranged offset relative to each other.

In the embodiment shown in FIG. 13, the slots 23 and 24 of the housing 22 are not parallel but inclined or helical to the housing axis.

Figure 14:
FIG. 14 shows one manner in which the edges of the slots can be bent.
Figure 15:
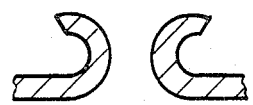
FIG. 15 shows the edges of the slot rolled over to prevent inwardly directed notch effects.

In cases where the metallic housing is completely embedded in the insulating body of the fitting, notch effects on the insulating body can emanate from the edges of the slots. To prevent such inwardly directed notch effects, the slot edges may be rolled over, as is shown in FIGS. 14 and 15.

Figure 16:
FIG. 16 shows the electric bridging of a slot in a metallic housing by means of a shaped part of electrically conductive elastic material, in cross section.
Figure 17:
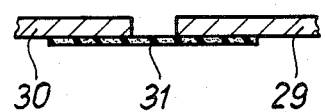
FIG. 17 is a cross-sectional view showing an electrically conductive elastic tape bridging a slot.

In the vicinity of the slots of the metallic housing, the electric shielding effect of the housing is interrupted. If the slots are narrow enough, this has no detrimental effect. However, the slots can be bridged electrically, as shown in FIGS. 16 and 17, for instance, by means of a shaped part 28 of electrically conductive elastic material with an electrically conducting surface. This shaped part is pushed over the slot edges 30 and 29. According to FIG. 17, an electrically conductive and elastic tape 31, which may also be self-adhesive, can be arranged on the underside of the slot edges 30 and 29.

Figure 18:
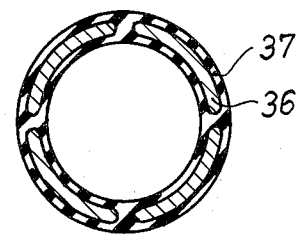
FIG. 18 is a cross section of a metallic housing with an embedding layer of elastic plastic.

FIG. 18 shows, in a cross section, a housing which consists of a slotted metal tube 36 and an embedding layer 37 of elastic plastic. The housing is thus completely embedded in the elastic plastic 37. The plastic 37 is preferably made electrically conducting. In the case of insulating plastic, the surface of the embedment can be provided with an electrically conducting coating. This coating can be contacted to the metallic housing at the end faces of the housing. If an electrically conductive plastic is used for the embedment layer 37, the metallic housing 36 can also consist of individual sheet metal strips without connecting the latter together by metallic rings in an electrically conducting manner.

Figure 19:
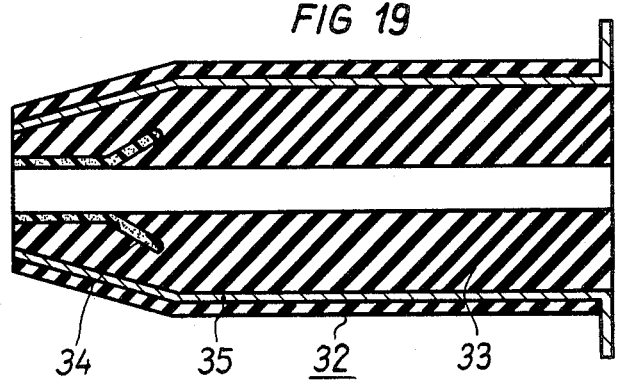
FIG. 19 is a longitudinal cross section illustrating a further embodiment of a fitting of the present invention.

FIG. 19 shows, in cross section, a straight plug connector 32 tapered toward the deflector 34, with a metallic housing 35 embedded in the elastic insulating body 33. The layer of the insulating body 33 outside the housing 35 serves as corrosion protection for the metallic housing.

If radial elasticity of the housing at the ends of the metallic housings shown in FIGS. 1 to 19 is not required because of suitable mechanical design of the elastic insulating body, it is advisable to let the slots end before the ends of the housing. The ends of the housings therefore have the form of rings.

What is claimed is:

1. In a fitting for plastic insulated, shielded electric cables, especially medium and high voltage cables, including an elastic prefabricated insulating body having an outer tubular metallic housing and a hole extending along the axis of the insulating body for receiving at least one end of an electric cable, the improvement comprising, the outer housing being made of sheet metal and having at least one slot therein extending in the direction of the axis of said housing.

2. The improvement according to claim 1, wherein said at least one slot is interrupted one or more times.

3. The improvement according to claim 1 comprising slots uniformly distributed at the circumference of the tubular housing.

4. The improvement according to claim 3 wherein the ends of slots adjacent in the circumferential direction of the tubular housing are arranged offset to each other in the axial direction.

5. The improvement according to claim 1 wherein said housing comprises several sheet metal strips arranged at a distance from each other.

6. The improvement according to claim 5, and further including at least one metal ring connecting the sheet metal strips to each other mechanically and electrically.

7. The improvement according to claim 1 wherein said at least one slot is electrically bridged at least on the inside of the housing by means of an electrically conductive elastic plastic.

8. The improvement according to claim 7, wherein said electrically conductive bridging consists of a tubular electrically conductive layer.

9. The improvement according to claim 1 wherein the tubular housing is embedded in the insulating body.

10. The improvement according to claim 9, wherein the outer layer of the insulating body consists of an electrically conductive elastic plastic and wherein the tubular housing is embedded in this layer of the insulating body.

11. The improvement according to claim 1 and further including corrosion protection at the surface of the tubular housing.

12. The improvement according to claim 1 wherein said tubular housing is cemented to the insulating body by means of an adhesion agent.

13. The improvement according to claim 1, wherein said at least one slot extends parallel to said housing axis.

14. The improvement according to claim 1, wherein said at least one slot is inclined to the housing axis.

15. The improvement according to claim 1 wherein said tubular metallic housing is in the shape of a T.

16. The improvement according to claim 1, wherein said tubular metallic housing is in the shape of an elbow.

17. The improvement according to claim 15 or 16, wherein said metallic housing consists of two half-shells.

* * * * *